July 21, 1925.
R. F. BROCK
SHOCK EQUALIZER
Filed July 18, 1923
1,546,711
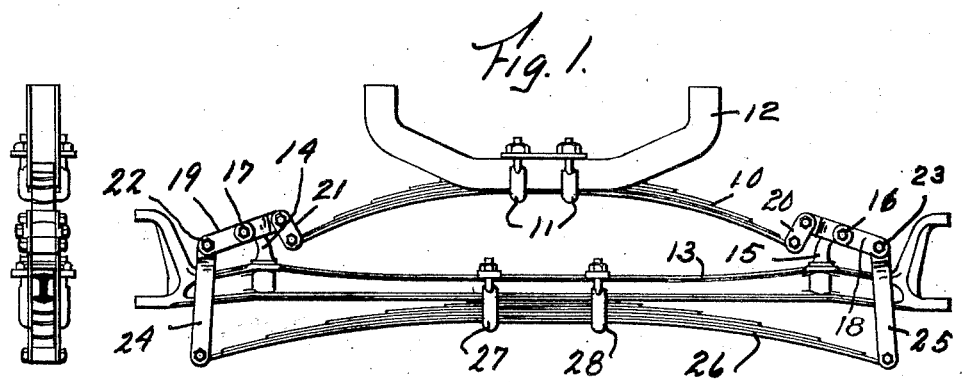
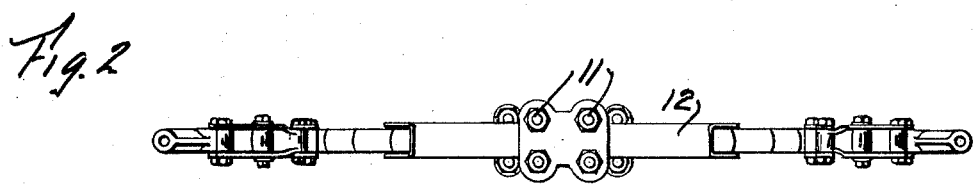
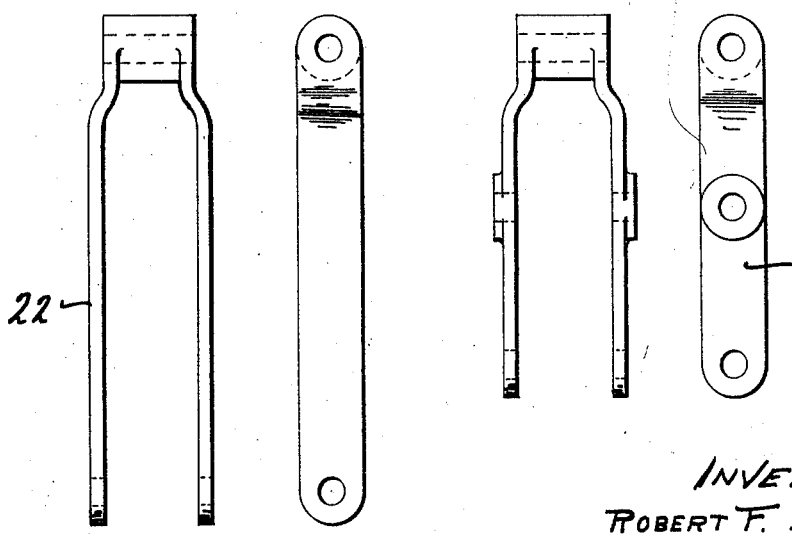
INVENTOR
ROBERT F. BROCK
by Frank Waterfield
ATTORNEY Patented July 21, 1925.

1,546,711

UNITED STATES PATENT OFFICE.

ROBERT F. BROCK, OF FRESNO, CALIFORNIA, ASSIGNOR OF ONE-HALF TO L. N. PATERSON, OF FRESNO, CALIFORNIA.

SHOCK EQUALIZER.

Application filed July 18, 1923. Serial No. 652,307.

*To all whom it may concern:*

Be it known that I, ROBERT F. BROCK, a citizen of the United States, and resident of Fresno, in the county of Fresno, State of California, have invented certain new and useful Improvements in Shock Equalizers, of which the following is a specification.

My invention relates primarily to a shock equalizer for use primarily with Ford automobiles, although it is not limited to any specific style of vehicle, and the object thereof is to provide a device in connection with the usual load carrying springs whereby the shock caused from passing over obstructions or depressions in the road are equalized or absorbed.

Another object is to provide a cheap, simple and efficient device of the above character which may be attached to or detached from its place of use without material alteration of the vehicle.

Other objects and advantages will appear hereinafter and, while I have shown and will describe the preferred form of my invention, I wish it understood that I do not limit myself to such preferred form but that various changes and adaptations may be made therein without departing from the spirit of my invention.

In the drawings accompanying and forming a part hereof:

Fig. 1 is a front elevation of the front axle of an automobile showing my device attached thereto.

Fig. 2 is a left hand elevation of Fig. 1.

Fig. 3 is a top plan of Fig. 1.

Figs. 4 and 5 are side and front elevations, respectively, on an enlarged scale, of a portion of my device.

Figs. 6 and 7 are similar views of another portion of my device.

Referring to the drawings, 10 indicates the usual leaf spring which is attached by the usual clips 11 to the body 12. 13 indicates the front axle of the vehicle. Extending upwardly from near each end of axle 13 are the spring perches 14 and 15 which are curved to extend upwardly and outwardly, and pivotally mounted in the free ends of perches 14 and 15, intermediate their ends, by bolts 16 and 17, are clevises 18 and 19 the closed ends of which are connected by links 20 and 21 to the ends of the springs 10. Pivotally mounted in the other ends of clevises 18 and 19, by means of bolts 22 and 23, are clevises 24 and 25 between the lower ends of which are mounted the ends of the leaf spring 26. Spring 26 is rigidly secured to the lower edge of axle 13 by means of spring clips 27 and 28 in the usual manner.

Having described my invention, what I claim is:

1. A shock equalizer for auto vehicles comprising in combination an axle; a body; a laminated half elliptic spring carried by said body to extend parallel with said axle; a clevis rockably mounted at each end of said axle; a connection between one end of each of said clevises and the free ends of said spring; a laminated half elliptic spring mounted on the under side of said axle to extend parallel therewith; and swinging connections from the free ends of said clevises to the free ends of said last spring.

2. A shock equalizer for auto vehicles comprising an axle; a perch extending upwardly and outwardly from said axle near each end thereof; a clevis rockably mounted intermediate its ends in the free end of said perch; a half elliptic leaf spring; links connecting the free ends of said leaf spring and the inner ends of said clevises; a leaf spring rigidly mounted intermediate its ends upon the under side of said axle, centrally thereof; and pivotable connections from the free ends of said last spring to the free ends of said clevises.

3. A shock equalizer for auto vehicles comprising in combination an axle; a body; a laminated half elliptic spring secured to said body to extend parallel with said axle; a complementary laminated spring member secured upon the under side of said axle, centrally thereof to extend parallel with said first mentioned spring; a rockable connection between the first spring and said axle; and a pivotable connection between the ends of said last spring and said rockable connection.

4. A shock equalizer for vehicles comprising a pair of levers rockably mounted one at each end of the axle, intermediate their ends; a laminated, downwardly depending, half elliptic, spring secured to the vehicle body; pivotable connections between the free ends of said spring and said levers; a downwardly depending, laminated, half elliptic, spring mounted on the under side of said axle; and a pivotable connection between each end of said spring and the free ends of said levers.

5. A shock equalizer for vehicles comprising in combination an axle; a vehicle body; a downwardly depending, laminated, half elliptic, spring carried by said body, immediately above and parallel with said axle; a perch extending upwardly from each end of said axle; a clevis pivotally mounted intermediate its ends in each of said perches; a bearing in the inner end of each of said clevises; a pair of links mounted one at each side of said bearing and connecting with the ends of said spring; a downwardly depending, complementary, laminated spring mounted on the under side of said axle to extend parallel therewith and in register with said first spring; a clevis connecting the free ends of said last spring with the free ends of said first clevises.

6. In a shock equalizer for vehicles the combination of an axle; a vehicle body; a downwardly depending, half elliptic spring carried by said body, extending parallel with said axle, above the same; a downwardly depending, half elliptic, complementary spring secured to the under side of said axle in register with, and of a greater length than, said first spring; a perch extending upwardly from each end of said axle; a substantially U-shaped link member pivotally mounted intermediate its ends in each of said perches to straddle the same, in longitudinal alignment with said springs, the closed ends of said U-shaped members terminating in bearings; a pair of links connecting said bearings with the free ends of said springs; a substantially U-shaped clevis connecting the free ends of said first U-shaped members with the free ends of said complementary spring, the upper ends of said clevises terminating in bearings pivotally mounted between the free ends of the legs of said U-shaped members, the legs of said clevises straddling said axle and having the free ends of said complementary spring pivotally mounted between the lower ends of the legs thereof.

In witness that I claim the foregoing I have hereunto set my hand this 7th day of July, 1923.

ROBERT F. BROCK.